United States Patent [19]

Lease

[11] Patent Number: 5,738,341

[45] Date of Patent: Apr. 14, 1998

[54] RETRACTABLE ELECTRIC FENCE SYSTEM

[76] Inventor: Joann R. Lease, 805 Barts Church Rd., Hanover, Pa. 17331

[21] Appl. No.: 825,754

[22] Filed: Apr. 3, 1997

[51] Int. Cl.⁶ .............................. A01K 3/00; E04H 17/14
[52] U.S. Cl. .............................................................. 256/10
[58] Field of Search ................................................ 256/10

[56] References Cited

U.S. PATENT DOCUMENTS 3,016,229   1/1962   Jacobson .................................. 256/10

FOREIGN PATENT DOCUMENTS

| 66371 | 2/1957 | France | 256/10 |
|---|---|---|---|
| 2450557 | 11/1980 | France | 256/10 |
| 767795 | 2/1957 | United Kingdom | 256/10 |
| 830458 | 3/1960 | United Kingdom | 256/10 |
| 867497 | 5/1961 | United Kingdom | 256/10 |
| 1325191 | 8/1973 | United Kingdom | 256/10 |
| WO92/08334 | 5/1992 | WIPO | 256/10 |

*Primary Examiner*—Anthony Knight

[57] ABSTRACT

A retractable electric fence system including a plurality of primary posts with at least one spring-biased spool situated on them. Next provided is conductive wire wrapped about the spools and adapted to remain taut between the primary posts by means of the spring biased spools.

2 Claims, 4 Drawing Sheets

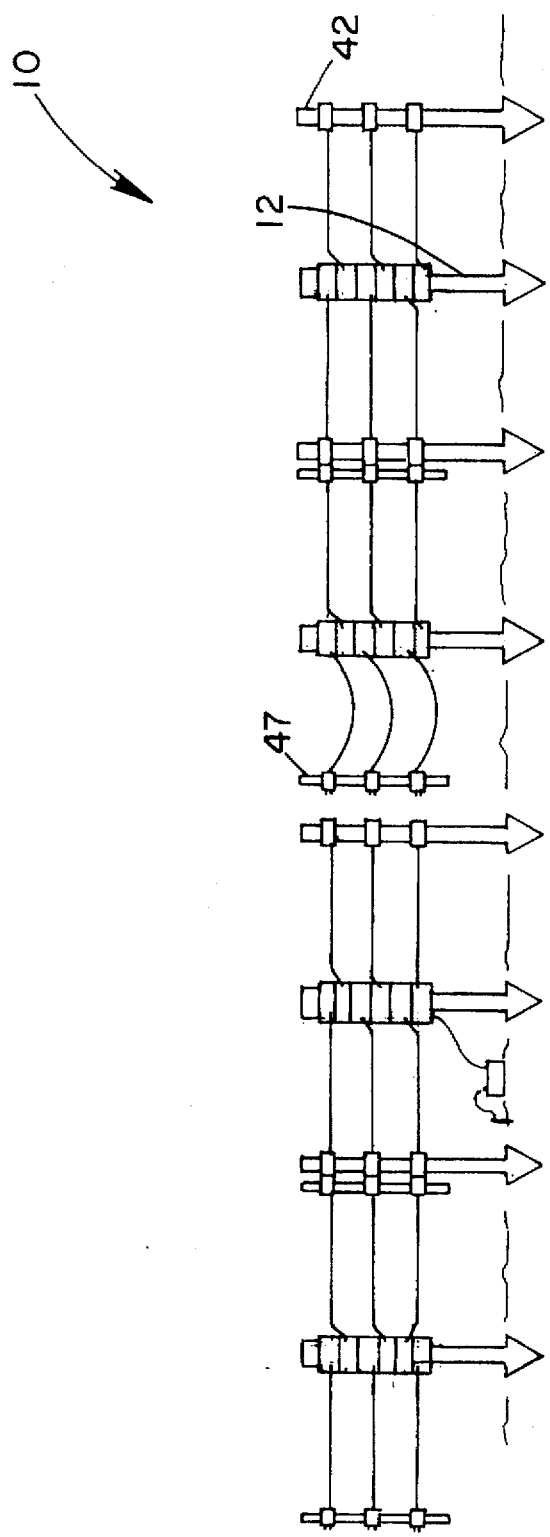
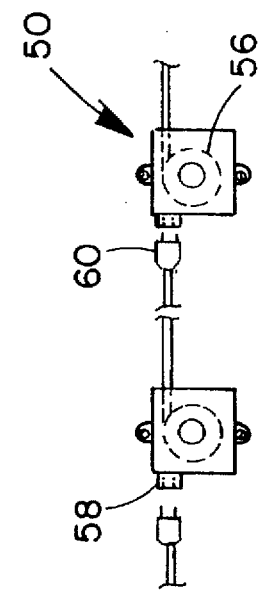
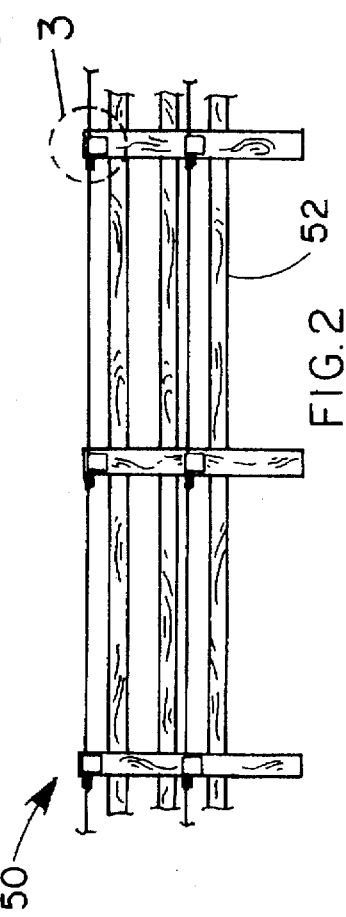

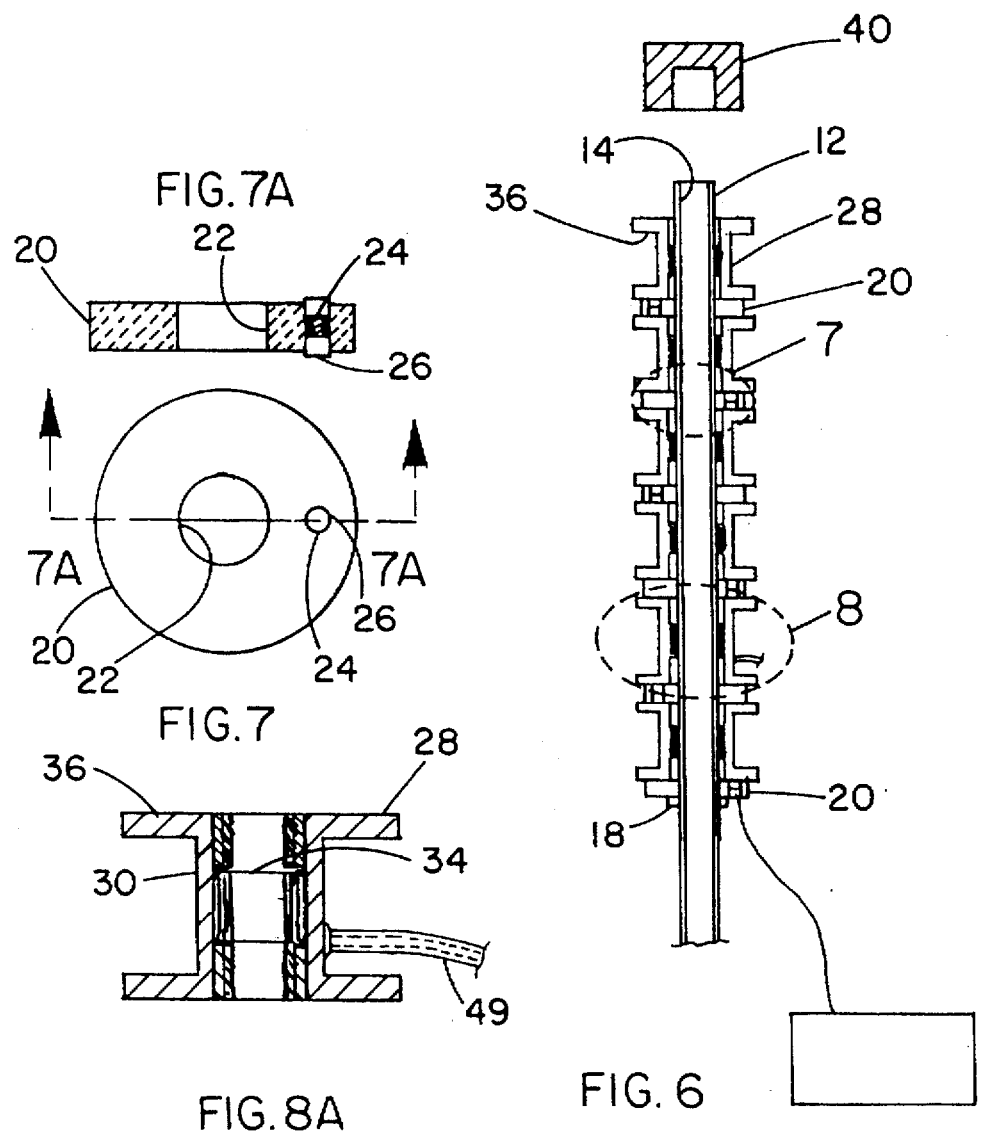

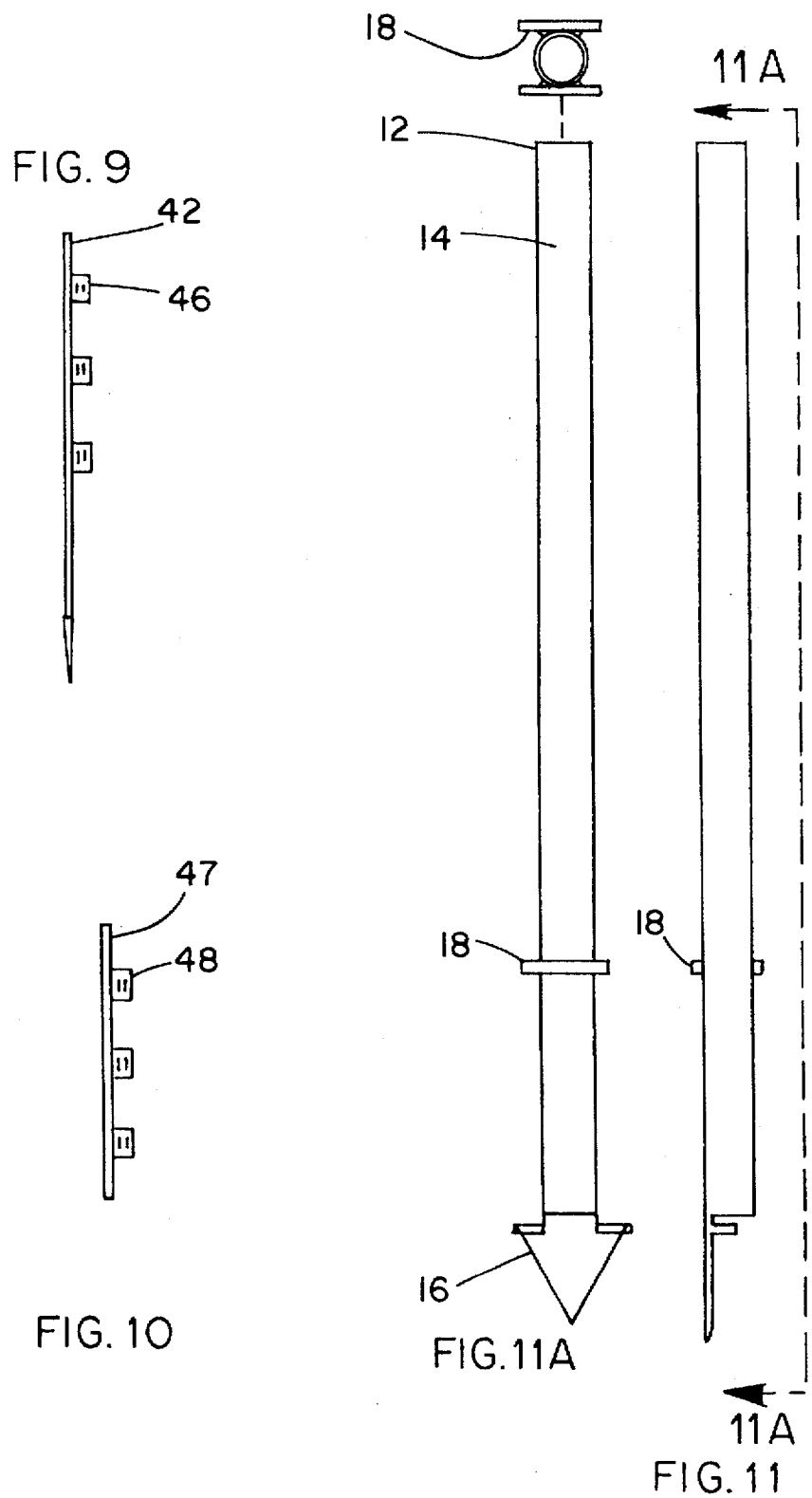

5,738,341

RETRACTABLE ELECTRIC FENCE SYSTEM

BACKGROUND OF THE INVENTION

1. Field of the Invention

The present invention relates to a retractable electric fence system and more particularly pertains to allowing convenient installation and maintenance of an electric fence.

2. Description of the Prior Art

The use of electric fences is known in the prior art. More specifically, electric fences heretofore devised and utilized for the purpose of confining livestock are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,078,771 to Diggs; U.S. Pat. No. 4,083,535 to Britt; U.S. Pat. No. 4,356,999 to McShane; U.S. Pat. No. 4,067,547 to Peters; U.S. Pat. No. 5,186,436 to Cummings, Jr.; and U.S. Pat. Des. No. 269,912 to Aho.

In this respect, the retractable electric fence system according to the present invention substantially departs from the conventional concepts and designs of the prior art, and in so doing provides an apparatus primarily developed for the purpose of allowing convenient installation and maintenance of an electric fence.

Therefore, it can be appreciated that there exists a continuing need for a new and improved retractable electric fence system which can be used for allowing convenient installation and maintenance of an electric fence. In this regard, the present invention substantially fulfills this need.

SUMMARY OF THE INVENTION

In view of the foregoing disadvantages inherent in the known types of electric fences now present in the prior art, the present invention provides an improved retractable electric fence system. As such, the general purpose of the present invention, which will be described subsequently in greater detail, is to provide a new and improved retractable electric fence system which has all the advantages of the prior art and none of the disadvantages.

To attain this, the present invention essentially comprises a plurality of primary posts each with a central vertical shaft constructed from an insulative material. Each primary post has a top end and a bottom end. As shown in FIGS. 11 & 11A, the bottom end of each primary post has a triangular shaped plate coupled thereto for allowing each primary post to be secured vertically in the ground. Each primary post further has a pair of stop plates coupled thereto adjacent the bottom end thereof. With reference now to FIGS. 6, 7 & 7A, a plurality of insulative spacers are provided having a disk-shaped configuration with a bore formed therein for allowing the spacer to be rotatably coupled about the post. An eccentric bore is also formed therein for housing a spring biased conductor contact that extends both above and below the associated insulative spacer. Note in particular FIG. 7A. Each primary post further has a plurality of conducting spools each having a central tubular portion with an interior surface and an exterior surface. Each spool has an annular groove formed in the interior surface thereof for housing a coil spring that has a first end thereof fixedly coupled to the associated post and a second end coupled to the interior surface of the spool. By this structure, the spools are rotatably coupled about the primary post between associated insulative spacers with the conductive contacts of the insulative spacers affording electrical communication between each of the conductive spools. For reasons that will become apparent hereinafter, it should be noted that the primary posts consist of a first set and a second set of primary posts. A plurality of first secondary posts are included and comprise of an elongated rectangular plate with a top end and a bottom end. The bottom end has a triangular shaped plate coupled thereto for allowing each first secondary post to be secured vertically in the ground. Each first secondary post has a plurality of spaced female connectors coupled thereto. The female connectors of pairs of first secondary posts are electrically connected to the conductive spools of a corresponding primary post of the first set of primary posts. Associated therewith is a plurality of second secondary posts each comprising an elongated rectangular plate with a top end and a bottom end, similar to the first secondary posts. Each second secondary post has a plurality of spaced male connectors coupled thereto. The male connectors of pairs of first secondary posts are electrically connected to the spools of a corresponding primary post of the second set of primary posts.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved retractable electric fence system which has all the advantages of the prior art electric fences and none of the disadvantages.

It is another object of the present invention to provide a new and improved retractable electric fence system which may be easily and efficiently manufactured and marketed.

It is a further object of the present invention to provide a new and improved retractable electric fence system which is of a durable and reliable construction.

An even further object of the present invention is to provide a new and improved retractable electric fence system which is susceptible of a low cost of manufacture with regard to both materials and labor, and which accordingly is then susceptible of low prices of sale to the consuming public, thereby making such retractable electric fence system economically available to the buying public.

Still yet another object of the present invention is to provide a new and improved retractable electric fence system which provides in the apparatuses and methods of the prior art some of the advantages thereof, while simultaneously overcoming some of the disadvantages normally associated therewith.

Still another object of the present invention is to allow convenient installation and maintenance of an electric fence.

Lastly, it is an object of the present invention to provide a new and improved retractable electric fence system including a plurality of primary posts with at least one spring-biased spool situated thereon. Next provided is conductive wire wrapped about the spools and adapted to remain taut between the primary posts by means of the spring biased spools.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the retractable electric fence system constructed in accordance with the principles of the present invention.

FIG. 2 is an illustration of an alternate embodiment of the present invention.

FIG. 3 is a close-up view of the encircled area shown in FIG. 2.

FIG. 6 is a cross-sectional view taken along line 6—6 shown in FIG. 4.

FIG. 7 is a top view of the spacer of the present invention.

FIG. 7A is a cross-sectional view of the spacer taken along line 7A—7A shown in FIG. 7.

FIG. 8 is a top view of the spool of the present invention.

FIG. 8A is a cross-sectional view of the spool taken along line 8A—8A shown in FIG. 8.

FIG. 9 is a side elevational view of one of the first secondary posts and the female connectors thereof.

FIG. 10 is a side elevational view of one of the second secondary posts and the male connectors thereof.

FIG. 11 a side view of one of the shafts of the primary posts.

FIG. 11A is another side view of one of the shafts of the primary posts.

Similar reference characters refer to similar parts throughout the several views of the drawings.

DESCRIPTION OF THE PREFERRED EMBODIMENT

Figure 4:
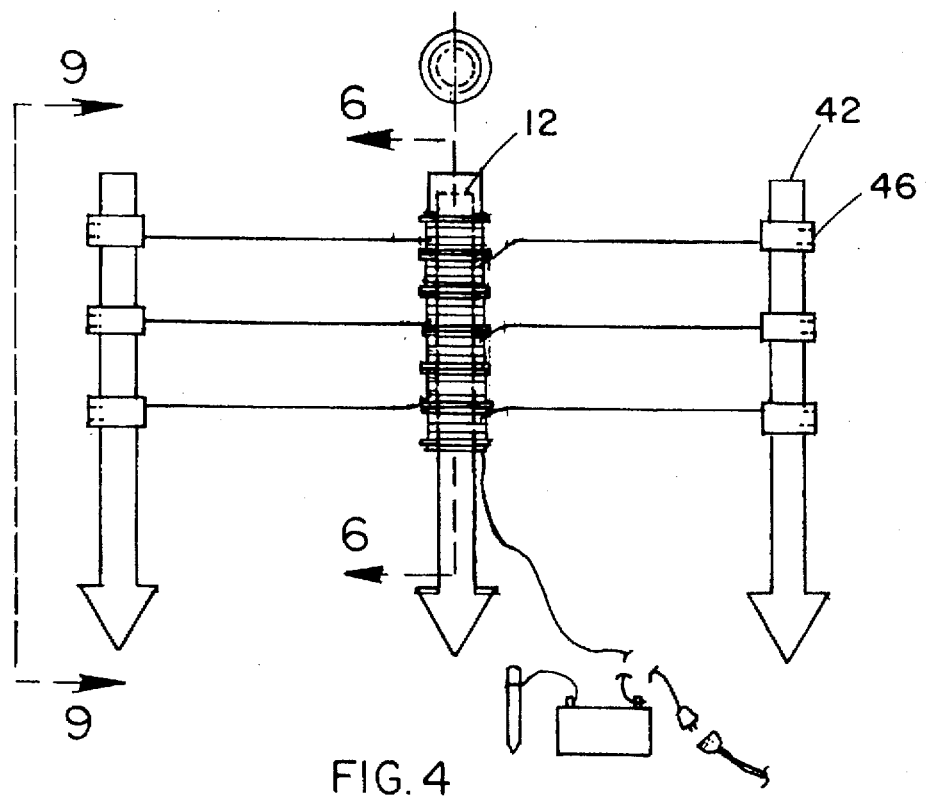
FIG. 4 is a side elevational view of one of the primary posts of the first set thereof.
Figure 5:
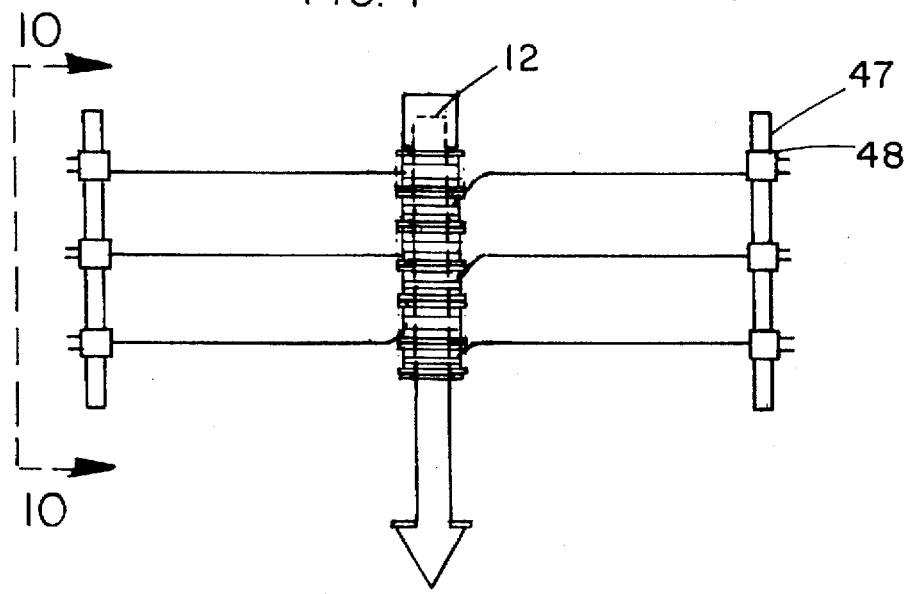
FIG. 5 is a side elevational view of one of the primary posts of the second set thereof.

With reference now to the drawings, and in particular to FIG. 1 thereof, a new and improved retractable electric fence system embodying the principles and concepts of the present invention and generally designated by the reference numeral 10 will be described.

The present invention, the new and improved retractable electric fence system, is comprised of a plurality of components. Such components in their broadest context include a plurality of primary posts and first and second secondary posts. Such components are individually configured and correlated with respect to each other so as to attain the desired objective.

More specifically, it will be noted that the system 10 of the present invention includes a plurality of primary posts 12 each with a central vertical shaft 14 constructed from an insulative material. Each primary post has a top end and a bottom end. As shown in FIGS. 11 & 11A, the bottom end of each primary post has a triangular shaped plate 16 coupled thereto for allowing each primary post to be secured vertically in the ground. A top edge of the vertical plate extends laterally beyond the circumference of the post for allowing a user to place a foot thereon to insert the post within the ground. Each primary post further has a pair of stop plates 18 coupled thereto adjacent the bottom end thereof. With reference now to FIGS. 6, 7 & 7A, a plurality of insulative spacers 20 are provided having a disk-shaped configuration with a bore 22 formed therein for allowing the spacer to be rotatably coupled about the post. An eccentric bore 24 is also formed therein for housing a spring biased conductor contact 26 that extends both above and below the associated insulative spacer. Note in particular FIG. 7A.

Each primary post further has a plurality of conducting spools 28 each having a central tubular portion 30 with an interior surface and an exterior surface. Each spool has an annular groove 32 formed in the interior surface thereof for housing a coil spring 34 that has a first end thereof fixedly coupled to the associated post and a second end coupled to the interior surface of the spool. It should be noted that the annular groove is defined by a pair of O-rings, as shown in FIG. 8A. The tubular portion of the spools further has a pair of annular flanges 36 situated on the top and bottom ends thereof.

By this structure, the spools are rotatably coupled about the primary post between associated insulative spacers with the conductive contacts of the insulative spacers affording electrical communication between each of the conductive spools. It should be noted that the spacers are preferably constructed from plastic so as to afford a corrosion free bottom and top surface on which the flanges of the spools may rotate against with minimal friction. As shown in FIG. 6, the primary posts preferably have an even number of spools(i.e. six) with a spacer coupled between the stop plates and the lowermost spool. Further, to maintain the spools and spacers in abutment, a cap 40 is provided for being coupled to the top end of the associated primary post. For reasons that will become apparent hereinafter, it should be noted that the primary posts are divided up into a first set and a second set of primary posts.

A plurality of first secondary posts 42 are included and comprise of an elongated rectangular plate with a top end and a bottom end. The bottom end has a triangular shaped plate 44 coupled thereto for allowing each first secondary post to be secured vertically in the ground. Each first secondary post has a plurality of spaced female connectors 46 coupled thereto. The female connectors of pairs of first secondary posts are electrically connected via wires to the conductive spools of a corresponding primary post of the first set of primary posts.

Associated therewith is a plurality of second secondary posts 47 each comprising an elongated rectangular plate with a top free end and a bottom free end. Each second secondary post has a plurality of spaced male connectors 48 coupled thereto. The male connectors of pairs of first secondary posts are electrically connected via wires 49 to the spools of a corresponding primary post of the second set of primary posts. In the preferred embodiment, the wires are between 10 and 12 feet in length and the number of male and female connectors on each secondary post is between 2 and 4. Further, as shown in FIG. 8A, the wires are coupled to the spools via a strong weld. It should be noted that the wire preferably consists of a plastic tape with a wire weaved therethrough thus being intermittently exposed through sides of the tape.

In use, the primary posts are planted in the ground and the secondary posts are situated therebetween with the female conductors coupled with the male conductors for providing a closed periphery and a closed circuit through which current may flow. To ensure proper interconnection, it is imperative that primary posts of the first set thereof are only situated adjacent primary posts of the second set thereof and visa-versa. To provide necessary current flow, the spring-biased contact of the lowermost spacer of one of the primary posts is connected via a wire to an alternating current source. Such alternating current source may be portable. As such, upon an animal touching the wire, a ground is provided for permitting current to flow through the animal thus containing the animal within the periphery defined by the wire. It should be noted that the present invention further has another inherent advantage in that upon an animal running into the wire, instead of it breaking, it will merely dispense additional wire.

In an alternate embodiment 50 shown in FIGS. 2 & 3, the primary posts are components of a conventional fence constructed from wood. A plurality of cross beams 52, also constructed from wood, are connected between the primary posts, as is conventional in the art. The spring-biased spools 54 are situated within a rectangular housing and have a pair of eyelets 56 formed on a periphery thereof for allowing screwably coupling of the spools on a top or intermediate extent of the primary posts. The housing also has a female plug 58 situated on a first side face thereof. In the alternate embodiment, the wires each have a first end coupled to an associated spring-biased spool in electrically communication with the female plug. While not shown, this electrical communication is accomplished by means of a simple brush contact which is in communication with an O-ring contact situated on the spool, as is common in the art. A second end of each wire is equipped with a male plug 60 for engaging the female plug of another spring-biased spool. By this structure, a spool may be coupled at various heights to each primary post of the conventional wooden fence and the male plugs may be conveniently extended to engage the female plug of a spool situated on an adjacent primary post at a common height. It should be understood that this is done for the entire fence such that a closed circuit is afforded through which current may flow.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved retractable electric fence system comprising, in combination:

a plurality of primary posts each including a central vertical shaft constructed from an insulative material with a top end and a bottom end, the bottom end having a triangular shaped plate coupled thereto for allowing each primary post to be secured vertically in the ground, each primary post further having a pair of stop plates coupled thereto adjacent the bottom end thereof, a plurality of insulative spacers having a disk-shaped configuration with a bore formed therein for being rotatably coupled about the post and an eccentric bore formed therein for housing a spring biased conductor contact that extends both above and below the associated insulative spacer, each primary post further having a plurality of conducting spools each including a central tubular portion with an interior surface and an exterior surface, each spool having an annular groove formed in the interior surface thereof for housing a coil spring that has a first end thereof fixedly coupled to the associated post and a second end coupled to the interior surface of the spool whereby the spools are rotatably coupled about the primary post between associated insulative spacers with the conductive contacts of the insulative spacers affording electrical communication between each of the conductive spools, the primary posts consisting of a first set and a second set of primary posts;

a plurality of first secondary posts each comprising an elongated rectangular plate with a top end and a bottom end, the bottom end having a triangular shaped plate coupled thereto for allowing each first secondary post to be secured vertically in the ground, each first secondary post having a plurality of spaced female connectors coupled thereto, wherein the female connectors of pairs of first secondary posts are electrically connected to the conductive spools of a corresponding primary post of the first set of primary posts; and a plurality of second secondary posts each comprising an elongated rectangular plate with a top end and a bottom end, each second secondary post having a plurality of spaced male connectors coupled thereto, wherein the male connectors of pairs of first secondary posts are electrically connected to the spools of a corresponding primary post of the second set of primary posts;

whereby the primary posts are planted in the ground and the secondary posts are situated therebetween with the female conductors coupled with the male conductors for providing a closed periphery and a closed circuit through which current may flow.

2. A retractable electric fence system comprising:

a plurality of primary posts;

a plurality of first secondary posts each comprising an elongated rectangular plate with a top end and a bottom end, the bottom end adapted to be secured vertically in the ground, each first secondary post having a plurality of spaced female connectors coupled thereto, wherein the female connectors are electrically connected via at least one wire to a primary post; and a plurality of second secondary posts each comprising an elongated rectangular plate with a top free end and a bottom free end, each second secondary post having a plurality of spaced male connectors coupled thereto, wherein the male connectors are electrically connected via at least one wire to a primary post;

whereby the primary posts are planted in the ground and the secondary posts are situated therebetween with the female conductors releasably coupled with the male conductors for providing a closed periphery and a closed circuit through which current may flow;

wherein the first and second secondary posts are situated in a close spaced parallel relationship when interconnected.

* * * * *